(12) United States Patent
Conger et al.

(10) Patent No.: US 12,225,278 B2
(45) Date of Patent: Feb. 11, 2025

(54) VEHICULAR DRIVER MONITORING SYSTEM WITH CAMERA VIEW OPTIMIZATION

(71) Applicant: Magna Electronics Inc., Auburn Hills, MI (US)

(72) Inventors: Jonathan D. Conger, Huntington Woods, MI (US); Steven V. Byrne, Goodrich, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 0 days.

(21) Appl. No.: 18/600,961

(22) Filed: Mar. 11, 2024

(65) Prior Publication Data

US 2024/0214666 A1 Jun. 27, 2024

Related U.S. Application Data

(63) Continuation of application No. 17/663,462, filed on May 16, 2022, now Pat. No. 11,930,264.
(Continued)

(51) Int. Cl.
*G06V 20/00* (2022.01)
*B60R 1/12* (2006.01)
(Continued)

(52) U.S. Cl.
CPC .............. *H04N 23/58* (2023.01); *B60R 1/12* (2013.01); *G06V 10/147* (2022.01); *G06V 20/52* (2022.01);
(Continued)

(58) Field of Classification Search
CPC ........ H04N 23/58; H04N 23/74; H04N 23/54; H04N 23/55; H04N 23/6811; H04N 23/695; B60R 1/12; B60R 2001/1253; G06V 10/147; G06V 20/52; G06V 20/597; G06V 10/141
See application file for complete search history.

(56) References Cited

U.S. PATENT DOCUMENTS 5,550,677 A 8/1996 Schofield et al.
5,567,360 A 10/1996 Varaprasad et al.
(Continued)

FOREIGN PATENT DOCUMENTS

WO 2023034956 A1 3/2023

*Primary Examiner* — Frank F Huang
(74) *Attorney, Agent, or Firm* — HONIGMAN LLP

(57) ABSTRACT

A vehicular driver monitoring system includes a camera disposed at an interior rearview mirror assembly of a vehicle, an electronic control unit (ECU) with an image processor for processing image data captured by the camera. The camera is disposed at a mirror head of the interior rearview mirror assembly and moves in tandem with the mirror head when the mirror head is adjusted relative to a mounting portion of the interior rearview mirror assembly. The camera includes an imaging array sensor and a lens. The vehicular driver monitoring system, responsive to processing at the ECU of image data captured by the camera, monitors a body portion of a driver of the vehicle. The vehicular driver monitoring system adjusts viewing of the body portion of the driver by the camera to accommodate a change in a scene viewed by the camera.

41 Claims, 8 Drawing Sheets

Related U.S. Application Data

(60) Provisional application No. 63/201,894, filed on May 18, 2021.

(51) Int. Cl.
| | |
|---|---|
| *G06V 10/147* | (2022.01) |
| *G06V 20/52* | (2022.01) |
| *G06V 20/59* | (2022.01) |
| *H04N 23/58* | (2023.01) |
| *H04N 23/74* | (2023.01) |
| *G06V 10/141* | (2022.01) |

(52) U.S. Cl.
CPC ........... *G06V 20/597* (2022.01); *H04N 23/74* (2023.01); *B60R 2001/1253* (2013.01); *G06V 10/141* (2022.01)

(56) References Cited

U.S. PATENT DOCUMENTS

| | | | |
|---|---|---|---|
| 5,570,127 A | 10/1996 | Schmidt | |
| 5,670,935 A | 9/1997 | Schofield et al. | |
| 5,760,962 A | 6/1998 | Schofield et al. | |
| 5,796,094 A | 8/1998 | Schofield et al. | |
| 5,877,897 A | 3/1999 | Schofield et al. | |
| 6,097,023 A | 8/2000 | Schofield et al. | |
| 6,107,618 A * | 8/2000 | Fossum ............... H01L 25/167 | |
| | | | 257/E25.032 |
| 6,158,655 A | 12/2000 | DeVries, Jr. et al. | |
| 6,483,438 B2 | 11/2002 | DeLine et al. | |
| 6,593,565 B2 | 7/2003 | Heslin et al. | |
| 6,627,918 B2 | 9/2003 | Getz et al. | |
| 6,690,268 B2 | 2/2004 | Schofield et al. | |
| 6,703,925 B2 | 3/2004 | Steffel | |
| 6,824,281 B2 | 11/2004 | Schofield et al. | |
| 7,038,577 B2 | 5/2006 | Pawlicki et al. | |
| 7,184,190 B2 | 2/2007 | McCabe et al. | |
| 7,195,381 B2 | 3/2007 | Lynam et al. | |
| 7,224,324 B2 | 5/2007 | Quist et al. | |
| 7,249,860 B2 | 7/2007 | Kulas et al. | |
| 7,253,723 B2 | 8/2007 | Lindahl et al. | |
| 7,255,451 B2 | 8/2007 | McCabe et al. | |
| 7,274,501 B2 | 9/2007 | McCabe et al. | |
| 7,289,037 B2 | 10/2007 | Uken et al. | |
| 7,338,177 B2 | 3/2008 | Lynam | |
| 7,360,932 B2 | 4/2008 | Uken et al. | |
| 7,420,756 B2 | 9/2008 | Lynam | |
| 7,477,758 B2 | 1/2009 | Piirainen et al. | |
| 7,480,149 B2 | 1/2009 | DeWard et al. | |
| 7,538,326 B2 * | 5/2009 | Johnson ............... H04N 23/67 | |
| | | | 250/370.08 |
| 7,626,749 B2 | 12/2009 | Baur et al. | |
| 7,629,582 B2 * | 12/2009 | Hoffman ........... H01L 27/14647 | |
| | | | 250/339.01 |
| 7,720,580 B2 | 5/2010 | Higgins-Luthman | |
| 7,855,755 B2 | 12/2010 | Weller et al. | |
| 7,887,089 B2 | 2/2011 | Breed et al. | |
| 7,914,187 B2 | 3/2011 | Higgins-Luthman et al. | |
| 7,915,652 B2 * | 3/2011 | Lee ................... H01L 27/14621 | |
| | | | 257/E31.093 |
| 8,045,764 B2 * | 10/2011 | Hamza ................ G06V 40/193 | |
| | | | 382/117 |
| 8,049,640 B2 | 11/2011 | Uken et al. | |
| 8,258,932 B2 | 9/2012 | Wahlstrom | |
| 8,446,470 B2 | 5/2013 | Lu et al. | |
| 8,451,107 B2 | 5/2013 | Lu et al. | |
| 8,508,831 B2 | 8/2013 | De Wind et al. | |
| 8,520,970 B2 * | 8/2013 | Strandemar ............... G06T 5/50 | |
| | | | 382/263 |
| 8,529,108 B2 | 9/2013 | Uken et al. | |
| 8,730,553 B2 | 5/2014 | De Wind et al. | |
| 8,743,203 B2 | 6/2014 | Karner et al. | |
| 8,876,342 B2 | 11/2014 | Wimbert et al. | |
| 8,922,422 B2 | 12/2014 | Klar et al. | |
| 9,090,213 B2 | 7/2015 | Lawlor et al. | |
| 9,126,525 B2 | 9/2015 | Lynam et al. | |
| 9,174,578 B2 | 11/2015 | Uken et al. | |
| 9,346,403 B2 | 5/2016 | Uken et al. | |
| 9,405,120 B2 | 8/2016 | Graf et al. | |
| 9,487,159 B2 | 11/2016 | Achenbach | |
| 9,493,122 B2 | 11/2016 | Krebs | |
| 9,598,016 B2 | 3/2017 | Blank et al. | |
| 9,609,757 B2 | 3/2017 | Steigerwald | |
| 9,827,913 B2 | 11/2017 | De Wind et al. | |
| 9,878,669 B2 | 1/2018 | Kendall | |
| 9,900,490 B2 | 2/2018 | Ihlenburg et al. | |
| 10,017,114 B2 | 7/2018 | Bongwald | |
| 10,029,614 B2 | 7/2018 | Larson | |
| 10,046,706 B2 | 8/2018 | Larson et al. | |
| 10,065,574 B2 | 9/2018 | Tiryaki | |
| 10,152,811 B2 * | 12/2018 | Johnson ................... G06T 5/50 | |
| 10,166,924 B2 | 1/2019 | Baur | |
| 10,166,926 B2 | 1/2019 | Krebs et al. | |
| 10,261,648 B2 | 4/2019 | Uken et al. | |
| 10,315,573 B2 | 6/2019 | Bongwald | |
| 10,374,109 B2 * | 8/2019 | Mazur ................... H01L 31/036 | |
| 10,421,404 B2 | 9/2019 | Larson et al. | |
| 10,442,360 B2 | 10/2019 | LaCross et al. | |
| 10,466,563 B2 | 11/2019 | Kendall et al. | |
| 10,567,633 B2 | 2/2020 | Ihlenburg et al. | |
| 10,567,705 B2 | 2/2020 | Ziegenspeck et al. | |
| 10,703,204 B2 | 7/2020 | Hassan et al. | |
| 10,850,693 B1 * | 12/2020 | Pertsel ................. G06V 40/103 | |
| 10,922,563 B2 | 2/2021 | Nix et al. | |
| 10,958,830 B2 | 3/2021 | Koravadi | |
| 11,167,771 B2 | 11/2021 | Caron et al. | |
| 11,205,083 B2 | 12/2021 | Lynam | |
| 11,214,199 B2 | 1/2022 | LaCross et al. | |
| 11,240,427 B2 | 2/2022 | Koravadi | |
| 11,242,008 B2 | 2/2022 | Blank et al. | |
| 11,252,376 B2 | 2/2022 | Ihlenburg | |
| 11,341,671 B2 | 5/2022 | Lu et al. | |
| 11,348,374 B2 | 5/2022 | Kramer et al. | |
| 11,433,906 B2 | 9/2022 | Lu | |
| 11,450,113 B1 * | 9/2022 | Vaziri ..................... G06F 3/012 | |
| 11,465,561 B2 | 10/2022 | Peterson et al. | |
| 11,488,399 B2 | 11/2022 | Wacquant | |
| 11,493,918 B2 | 11/2022 | Singh | |
| 11,518,401 B2 | 12/2022 | Kulkarni | |
| 11,582,425 B2 | 2/2023 | Liu | |
| 11,873,751 B2 * | 1/2024 | Byrne ........................ F01N 9/00 | |
| 11,930,264 B2 | 3/2024 | Conger et al. | |
| 2002/0005999 A1 | 1/2002 | Hutzel et al. | |
| 2006/0033936 A1 * | 2/2006 | Lee ............................ G06T 5/20 | |
| | | | 358/1.2 |
| 2006/0050018 A1 | 3/2006 | Hutzel et al. | |
| 2007/0182528 A1 | 8/2007 | Breed et al. | |
| 2009/0040778 A1 | 2/2009 | Takayanagi et al. | |
| 2009/0273675 A1 * | 11/2009 | Jonsson ................. H04N 23/20 | |
| | | | 348/E5.09 |
| 2009/0302219 A1 * | 12/2009 | Johnson ..................... G01J 5/07 | |
| | | | 250/332 |
| 2010/0085653 A1 | 4/2010 | Uken et al. | |
| 2011/0080481 A1 | 4/2011 | Bellingham | |
| 2011/0144462 A1 * | 6/2011 | Lifsitz .................. A61B 5/0059 | |
| | | | 600/323 |
| 2014/0022390 A1 | 1/2014 | Blank et al. | |
| 2014/0267757 A1 * | 9/2014 | Abramson ............. H04N 23/62 | |
| | | | 348/164 |
| 2014/0285666 A1 | 9/2014 | O'Connell et al. | |
| 2014/0293169 A1 | 10/2014 | Uken et al. | |
| 2014/0313563 A1 | 10/2014 | Uken et al. | |
| 2014/0336876 A1 | 11/2014 | Gieseke et al. | |
| 2015/0009010 A1 | 1/2015 | Biemer | |
| 2015/0015710 A1 | 1/2015 | Tiryaki | |
| 2015/0022664 A1 | 1/2015 | Pflug et al. | |
| 2015/0092042 A1 | 4/2015 | Fursich | |
| 2015/0097955 A1 | 4/2015 | De Wind et al. | |
| 2015/0232030 A1 | 8/2015 | Bongwald | |
| 2015/0294169 A1 | 10/2015 | Zhou et al. | |
| 2015/0296135 A1 | 10/2015 | Wacquant et al. | |
| 2015/0352953 A1 | 12/2015 | Koravadi | |
| 2016/0137126 A1 | 5/2016 | Fursich et al. | |

(56) References Cited

U.S. PATENT DOCUMENTS

| | | |
|---|---|---|
| 2016/0209647 A1 | 7/2016 | Fursich |
| 2017/0217367 A1 | 8/2017 | Pflug et al. |
| 2017/0237946 A1 | 8/2017 | Schofield et al. |
| 2017/0274906 A1 | 9/2017 | Hassan et al. |
| 2017/0355312 A1 | 12/2017 | Habibi et al. |
| 2018/0096468 A1* | 4/2018 | Nguyen ............... H04N 23/741 |
| 2018/0134217 A1 | 5/2018 | Peterson et al. |
| 2018/0222414 A1 | 8/2018 | Ihlenburg et al. |
| 2018/0231976 A1 | 8/2018 | Singh |
| 2019/0054899 A1 | 2/2019 | Hoyos et al. |
| 2019/0101644 A1* | 4/2019 | DeMersseman ........ G01S 17/42 |
| 2019/0118717 A1 | 4/2019 | Blank et al. |
| 2019/0141236 A1* | 5/2019 | Bergstrom ............. G06Q 10/20 |
| 2019/0146297 A1 | 5/2019 | Lynam et al. |
| 2019/0168669 A1 | 6/2019 | Lintz et al. |
| 2019/0258131 A9 | 8/2019 | Lynam et al. |
| 2019/0364199 A1 | 11/2019 | Koravadi |
| 2019/0381938 A1 | 12/2019 | Hopkins |
| 2020/0141807 A1* | 5/2020 | Poirier ................... H04N 23/45 |
| 2020/0143560 A1 | 5/2020 | Lu et al. |
| 2020/0148120 A1 | 5/2020 | Englander et al. |
| 2020/0202151 A1 | 6/2020 | Wacquant |
| 2020/0242421 A1* | 7/2020 | Sobhany ............... B60R 16/037 |
| 2020/0320320 A1 | 10/2020 | Lynam |
| 2020/0327323 A1 | 10/2020 | Noble |
| 2020/0377022 A1 | 12/2020 | LaCross et al. |
| 2021/0056306 A1 | 2/2021 | Hu et al. |
| 2021/0122404 A1 | 4/2021 | Lisseman et al. |
| 2021/0136171 A1* | 5/2021 | Badam ...................... G06T 7/11 |
| 2021/0155167 A1 | 5/2021 | Lynam et al. |
| 2021/0162926 A1 | 6/2021 | Lu |
| 2021/0245662 A1 | 8/2021 | Blank et al. |
| 2021/0291739 A1* | 9/2021 | Kasarla ..................... B60R 1/04 |
| 2021/0306538 A1 | 9/2021 | Solar |
| 2021/0323473 A1 | 10/2021 | Peterson et al. |
| 2021/0368082 A1 | 11/2021 | Solar |
| 2022/0057269 A1 | 2/2022 | Parameswaran et al. |
| 2022/0111857 A1 | 4/2022 | Kulkarni |
| 2022/0242438 A1 | 8/2022 | Sobecki et al. |
| 2022/0254132 A1 | 8/2022 | Rother |
| 2022/0377219 A1 | 11/2022 | Conger et al. |
| 2023/0131471 A1 | 4/2023 | Sobecki et al. |
| 2023/0137004 A1 | 5/2023 | Huizen et al. |

* cited by examiner

VEHICULAR DRIVER MONITORING SYSTEM WITH CAMERA VIEW OPTIMIZATION

CROSS REFERENCE TO RELATED APPLICATION

The present application is a continuation of U.S. patent application Ser. No. 17/663,462, filed May 16, 2022, now U.S. Pat. No. 11,930,264, which claims the filing benefits of U.S. provisional application Ser. No. 63/201,894, filed May 18, 2021, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

This disclosure provides a vehicular driver monitoring system or vehicular occupant monitoring system that includes a camera disposed at an interior rearview mirror assembly of a vehicle equipped with the vehicular driver monitoring system. The camera views interior of the vehicle and captures image data. The system includes an electronic control unit (ECU) with electronic circuitry and associated software. The electronic circuitry of the ECU includes an image processor for processing image data captured by the camera. The camera includes an imaging array sensor and a lens. The camera is adjustable by at least one selected from the group consisting of (i) adjusting a position of the imaging array sensor relative to the lens and (ii) adjusting a position of the lens relative to the imaging array sensor. The vehicular driver monitoring system, responsive to processing at the ECU of image data captured by the camera, monitors a body portion of a driver of the vehicle and the vehicular driver monitoring system adjusts the camera to adjust the position of where the monitored body portion of the driver is imaged at the imaging array sensor.

These and other objects, advantages, purposes and features described herein will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture data of an interior of the vehicle and may process the data to detect objects within the vehicle. The system includes a processor or processing system that is operable to receive data from one or more sensors.

Figure 1:
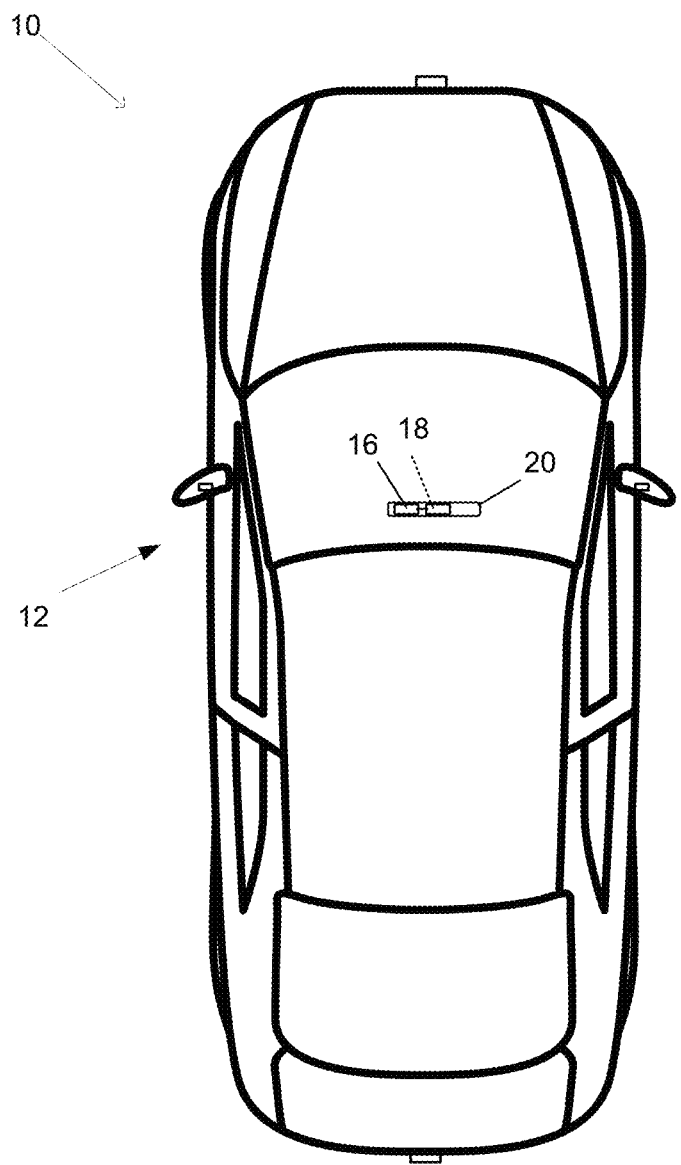
FIG. 1 is a plan view of a vehicle with a vision system that incorporates at least one camera.

Referring now to the drawings and the illustrative embodiments depicted therein, a vehicle 10 includes a sensing system or driver assist system 12 that includes at least one interior viewing imaging sensor or camera, such as a rearview mirror imaging sensor or camera 16 (FIG. 1). Optionally, an interior viewing camera may be disposed at the windshield of the vehicle. The vision system 12 includes a control or electronic control unit (ECU) 18 having electronic circuitry and associated software, with the electronic circuitry including a data processor or image processor that is operable to process image data captured by the sensor or camera or cameras, whereby the ECU may detect or determine presence of objects or the like (although shown in FIG. 1 as being part of or incorporated in or at an interior rearview mirror assembly 20 of the vehicle, the control and/or display device may be disposed elsewhere at or in the vehicle). The data transfer or signal communication from the sensor or camera to the ECU may comprise any suitable data or communication link, such as a vehicle network bus or the like of the equipped vehicle.

Many vehicles use vision systems to incorporate driver monitoring systems (DMS) and/or occupant monitoring systems (OMS) using a camera placed near or at or within the rearview mirror assembly (e.g., behind the glass of the rearview mirror). Placement of a camera (or other imaging sensor) within or at the rearview mirror presents unique challenges. For example, the rearview mirror may be adjusted within a broad range by drivers to optimize their rear visibility (e.g., based on a height of the driver), and this adjustment changes the field of view (i.e., the "aim") of the camera. Another challenge includes differences between left-hand drive vehicles and right-hand drive vehicles. These differences may require unique camera assemblies for ideal aim at the driver. Additionally, when optimizing the monitoring system in order to include all occupants of the vehicle within the field of view of the camera during a variety of different conditions requires sacrificing driver-specific visibility. That is, a field of view that encompasses each occupant of the vehicle may not align with a mirror orientation for the driver. Moreover, often a significant portion of the field of view of the camera (or other image sensor) includes irrelevant portions (e.g., the headliner) of the vehicle and as such is wasted.

Figure 2:
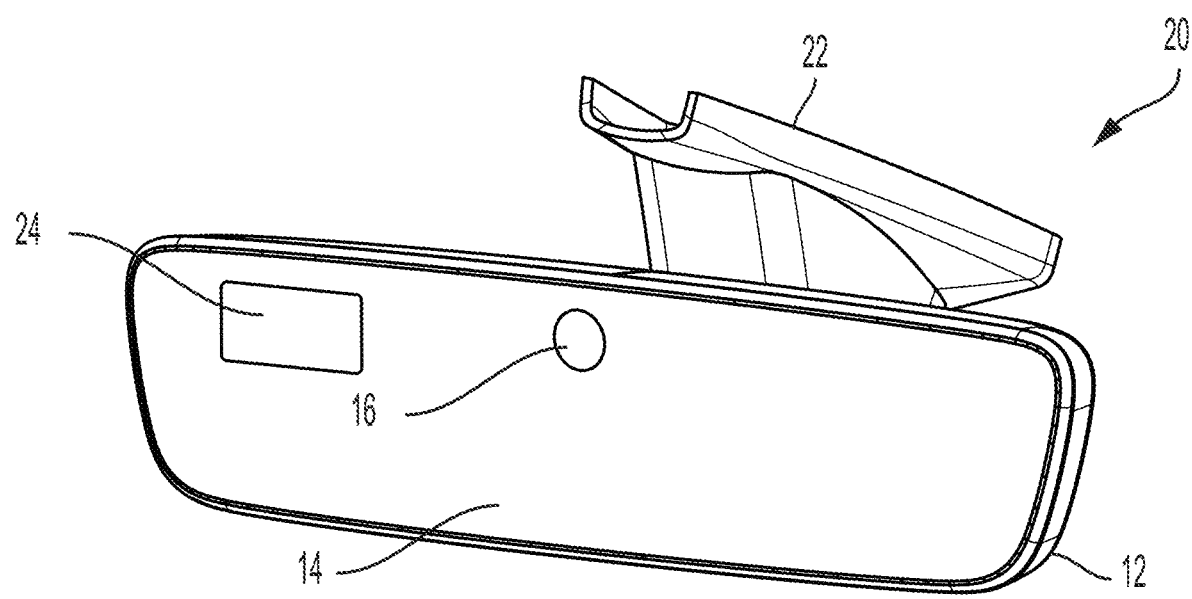
FIG. 2 is a perspective view of an interior rearview mirror assembly, showing a camera and light emitters behind the reflective element.

As shown in FIG. 2, the mirror assembly 20 includes or is associated with a driver monitoring system (DMS), with the mirror assembly comprising a driver/occupant monitoring camera 16 disposed at a back plate (and viewing through an aperture of the back plate) behind the reflective element 14 and viewing through the reflective element toward at least a head region of the driver of the vehicle. The DMS includes a near infrared light emitter 24 disposed at the back plate and emitting light through another aperture of the back plate and through the reflective element.

With the DMS camera disposed in the mirror head 12, the camera moves with the mirror head (including the mirror casing and mirror reflective element that pivot at a pivot joint that pivotally connects the mirror head to the mounting structure 22 of the interior rearview mirror assembly that in turn mounts at a windshield or at a headliner of the equipped vehicle), such that, when the driver aligns the mirror to view rearward, the camera is aligned with the line of sight of the driver. The location of the DMS camera and the near IR LED(s) at the mirror head provide an unobstructed view to the driver. The DMS preferably is self-contained in the interior rearview mirror assembly and thus may be readily implemented in a variety of vehicles. The driver monitoring camera may also provide captured image data for an occupancy monitoring system (OMS) or another separate camera may be disposed at the mirror assembly for the OMS function.

The mirror assembly includes a printed circuit board (PCB) having a control or control unit comprising electronic circuitry (disposed at the circuit board or substrate in the mirror casing), which includes driver circuitry for controlling dimming of the mirror reflective element. The circuit board (or a separate DMS circuit board) includes a processor that processes image data captured by the camera 16 for monitoring the driver and determining, for example, driver attentiveness and/or driver drowsiness. The driver monitoring system includes the driver monitoring camera and may also include an occupant monitoring camera (or the driver monitoring camera may have a sufficiently wide field of view so as to view the occupant or passenger seat of the vehicle as well as the driver region), and may provide occupant detection and/or monitoring functions as part of an occupant monitoring system (OMS).

The mirror assembly may also include one or more infrared (IR) or near infrared light emitters 24 (such as IR or near-IR light emitting diodes (LEDs) or vertical-cavity surface-emitting lasers (VCSEL) or the like) disposed at the back plate behind the reflective element 14 and emitting near infrared light through the aperture of the back plate and through the reflective element toward the head region of the driver of the vehicle. The camera and near infrared light emitter(s) may utilize aspects of the systems described in International Application No. PCT/US2022/072238, filed May 11, 2022 and published Nov. 17, 2022 as International Publication No. WO 2022/241423, International Application No. PCT/US2022/070882, filed Mar. 1, 2022 and published Sep. 9, 2022 as International Publication No. WO 2022/187805, which are hereby incorporated herein by reference in their entireties.

One potential technique to optimize the visibility (i.e., the field of view) of the camera includes setting the lens-to-imager relationship to bias the field of view toward areas of interest. For example, setting the field of view lower to view the driver's hands or left/right to see more of the driver than the passenger. However, these techniques still lead to a sacrifice in performance when considering the range of people sizes, seat positions, and mirror positions.

Implementations herein include a driver monitoring system and/or occupant monitoring system that dynamically shifts a lens of a camera (relative to the imager) in real time by means of an actuator to optimize the field of view of the camera or other image sensor. Optionally, the system additionally performs autofocus. Optionally, the same or a different actuator is operable to aim illuminators (e.g., light emitting diodes (LEDs) or vertical-cavity surface-emitting laser (VCSEL) illuminators) at specific areas of interest. The lens and imager construction may utilize aspects of the cameras and systems described in U.S. patent application Ser. No. 17/650,255, filed on Feb. 8, 2022 and published Aug. 11, 2022 as U.S. Publication No. US-2022-0254132, which is hereby incorporated herein by reference in its entirety.

Figure 3A:
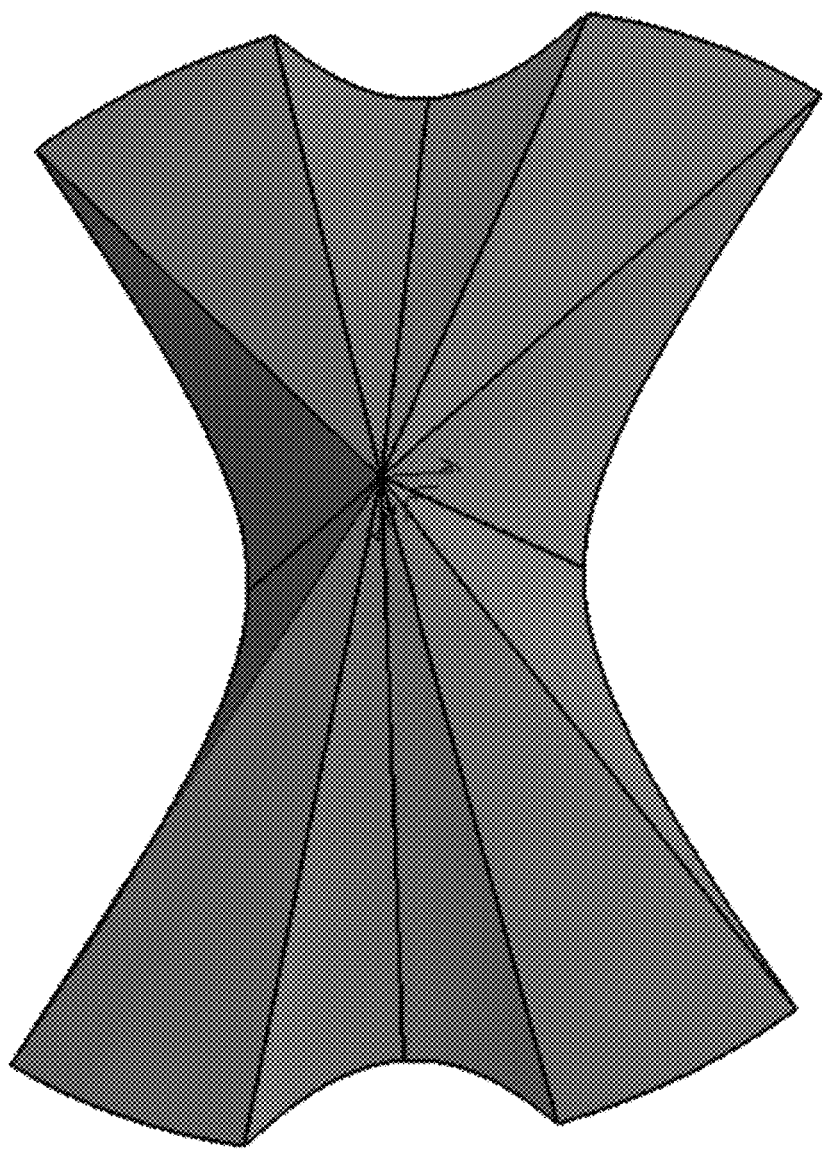
FIGS. 3A-3C are schematic views for field of view adjustments of an interior camera of a vehicle.
Figure 3B:
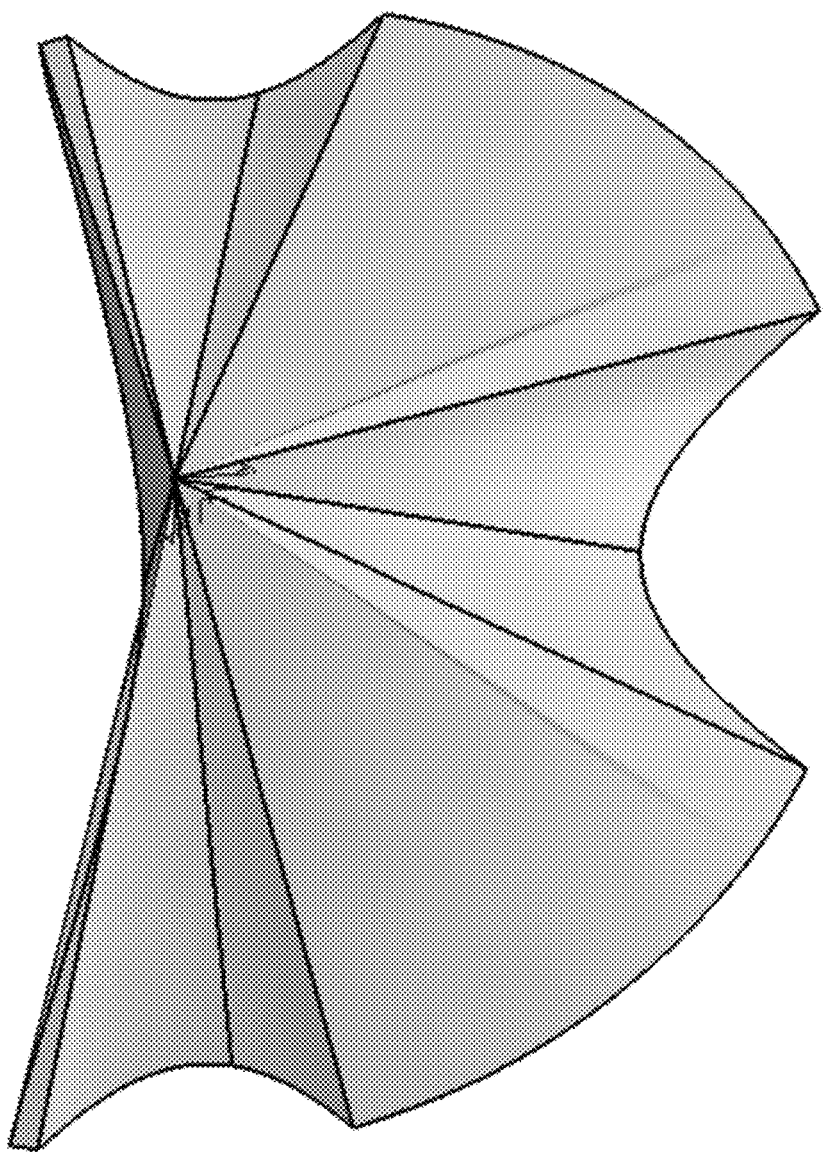
Figure 3C:
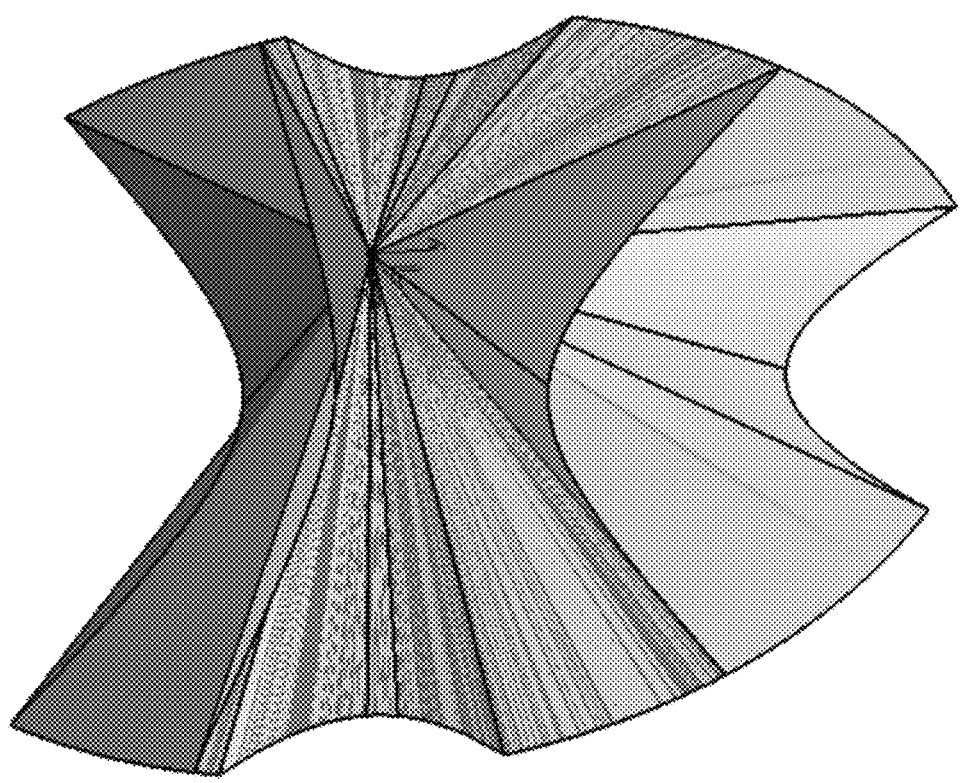

Referring now to FIGS. 3A-3C, an example of biasing the field of view of an image sensor lower (e.g., to provide a better view of passengers of the vehicle) than a default field of view (i.e., where the lens is aligned with a center of an imaging array or imager of the image sensor) is illustrated. FIG. 3A illustrates an example symmetrical camera field of view with a horizontal field of view of 70 degrees left and 70 degrees right and a vertical field of view of 40 degrees up and 40 degrees down. That is, the lens is disposed at or near a center of the image sensor. FIG. 3B illustrates an example of a shifted camera field of view. Here, the horizontal field of view is 70 degrees left and 70 degrees right and the vertical field of view is 20 degrees up and 60 degrees down. This may be accomplished, for example, by de-centering the lens optical axis relative to the image sensor of the camera to move the field of view "lower" relative to the traditional or default field of view of the image sensor. FIG. 3C illustrates the field of views of FIG. 3A and FIG. 3B overlayed together. As illustrated in FIG. 3C, the field of view of FIG. 3B extends lower than the field of view of FIG. 3A.

Figure 4:
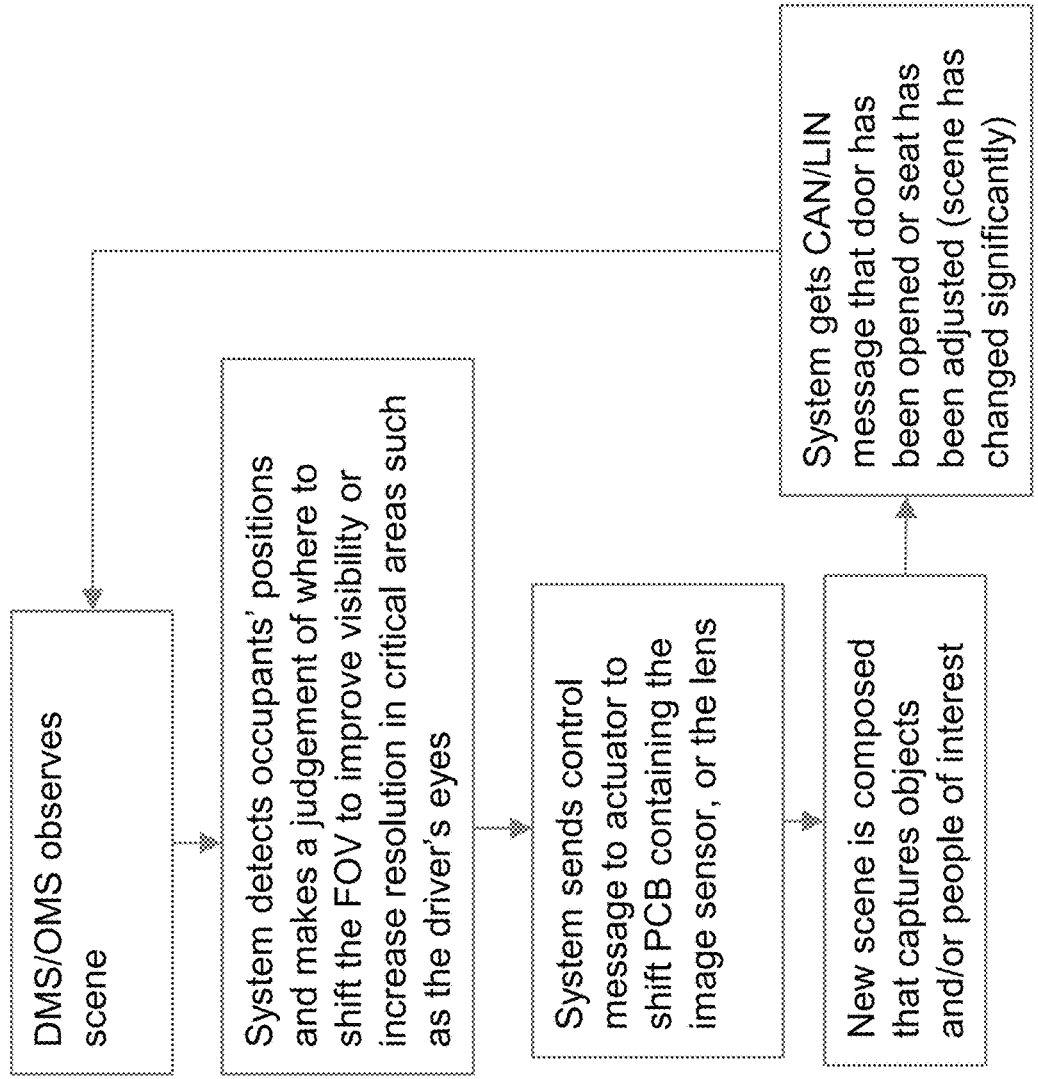
FIG. 4 is an exemplary block diagram of the vision system of FIG. 1.

Referring now to FIG. 4, an example block diagram for the system includes observing a scene by, for example, capturing and processing sensor data (via a DMS/OMS system and associated sensor or camera). Responsive to processing the sensor data, such as image data captured by a camera, the system detects the position of each of one or more occupants of the vehicle. The system determines whether and where to shift the field of view of the sensor (e.g., the camera) to improve visibility or increase resolution at critical areas (e.g., the driver's eyes, hands, etc.). For example, an actuator may shift the center axis of the lens downward relative to the imaging array sensor, such that the center axis of the lens (where resolution is greater than at the more curved perimeter regions of the lens) is at the lower region of the imaging array sensor, thereby providing enhanced resolution in the image data captured by the lower region of the imaging array sensor or imager, and/or the actuator may shift the center axis of the lens leftward (toward the driver side of the vehicle in a left-hand drive vehicle) relative to the imaging array sensor, such that the center axis of the lens (where resolution is greater than at the more curved perimeter regions of the lens) is at a left or driver-side region of the imaging array sensor, thereby providing enhanced resolution in the image data captured by the driver-side region of the imaging array sensor or imager (such as by utilizing aspects of the cameras described in U.S. Pat. Nos. 10,946,798 and/or 10,525,883, and/or U.S. patent application Ser. No. 17/650,255, filed on Feb. 8, 2022 and published Aug. 11, 2022 as U.S. Publication No. US-2022-0254132, which are both hereby incorporated herein by reference in their entireties). The system may shift the imager-lens relationship depending on positions of occupants within the vehicle. For example, the system may use a first imager-lens configuration when the driver is the only occupant of the vehicle and adjust to a second imager-lens configuration when there is a driver and an additional passenger that better includes the passenger within the field of view of the image sensor. Optionally, the system may adjust or shift the field of view or imager-lens configuration of the camera responsive to adjustment of the mirror head relative to the mounting structure (such as to adjust or set the rearward view for the particular driver sitting in a driver seat of the vehicle).

Based on the determination, the system sends a control message to the actuator that is operable to adjust the field of view of the sensor. For example, the actuator shifts a printed circuit board (PCB) that at least a portion of the imager is mounted on (e.g., an image sensor or imaging array) relative to the lens. Alternatively (or in addition to), the system shifts other parts of the sensor (e.g., a lens of a camera). The actuator moves or shifts some or all of the sensor to adjust the field of view or imager-lens configuration by moving the imager relative to the lens and the sensor captures sensor data representative of the adjusted scene. Thus, the system adjusts the imager-lens configuration of the camera without moving a housing or casing of the camera or mirror to maintain the rearview mirror at the driver's desired position. The actuator adjusts the principal view direction or imager-lens configuration of the camera based on the position of the mirror and/or the number of occupants in the vehicle and/or the size of the driver and/or the location of the driver's head in the vehicle. Optionally, when the system receives a message (e.g., a controller area network (CAN)/local interconnect network (LIN) message) that indicates that the scene has changed (e.g., the number or position of the occupants of the vehicle has changed), the system again repeats the process to readjust the field of view of the sensor. For example, the system may receive a message that a vehicle door has been opened, a seat has been adjusted, the mirror has been adjusted, etc.

Figure 5:
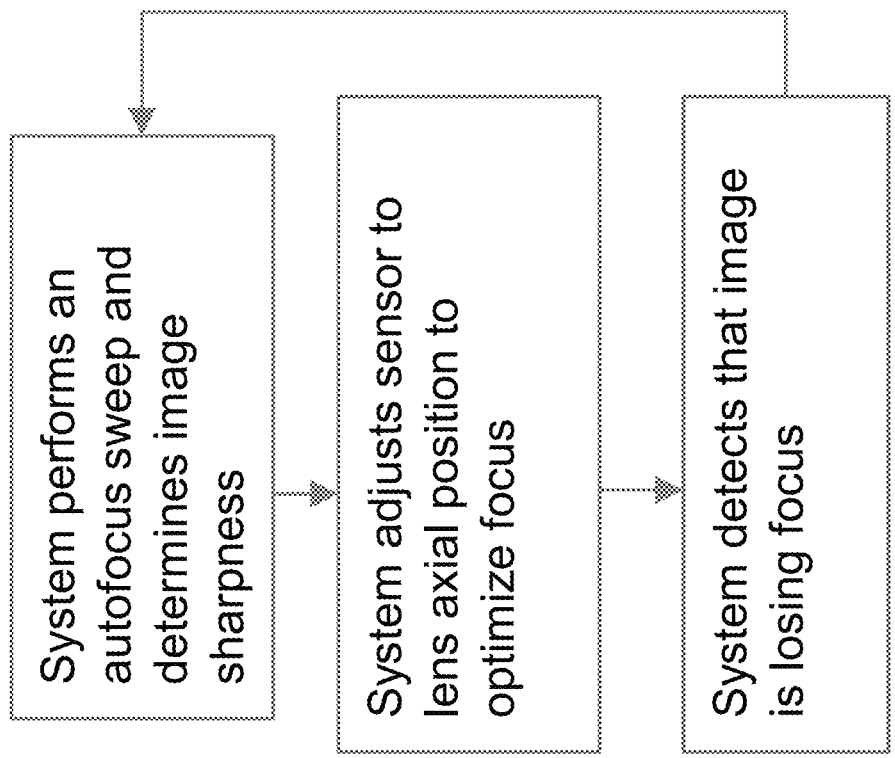
FIG. 5 is another exemplary block diagram of the vision system of FIG. 1.

Referring now to FIG. 5, an example block diagram for the system includes the system performing an autofocus sweep to determine image sharpness. Based on the autofocus sweep, the system adjusts the sensor-to-lens axial position in order to optimize focus of the sensor. Optionally, whenever the system determines or detects that the image is losing focus, the system may repeat the autofocus sweep and sensor adjustment. For example, when the system determines the image is out of focus by a threshold amount, the system performs the autofocus sweep technique.

Figure 6:
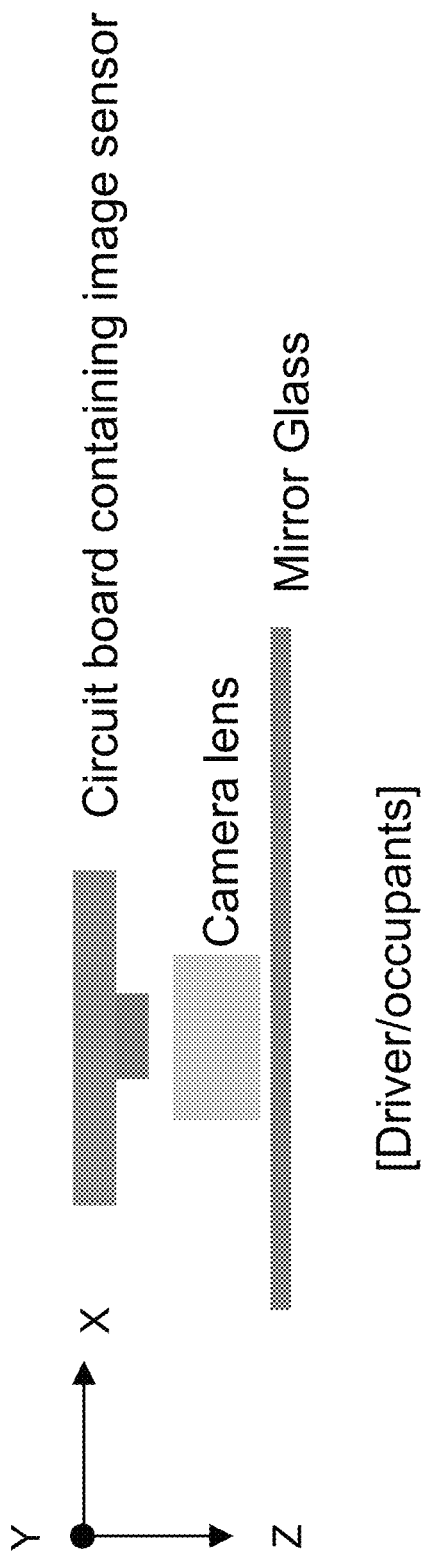
FIG. 6 is a schematic view of a dynamically adjustable camera of the vision system of FIG. 1.

Referring now to FIG. 6, movements to shift the field of view of the image sensor may generally be in the range of +/−0.5 to +/−1.5 mm in the radial direction (i.e., along the z axis), the horizontal direction (i.e., along the x axis), and/or the vertical direction (i.e., along the y axis). The system may adjust the focus of the sensor using movements within the range of +/−0.3 mm in the axial direction, (i.e., along the lens axis or the z axis). The system may include any number of actuators to shift or move or focus the sensor. For example, the system includes between one and six actuators to dynamically move the PCB, image sensor, lens, etc. in each axis independently. Portions of the sensor not actuated by the actuator(s) may be fixed to the mirror structure (e.g., a casing or housing of the rearview mirror).

Optionally, the actuators may adjust rotation angles in pitch, yaw, and roll of the camera or camera lens relative to the imager and apply those adjustments as needed. An illumination source (e.g., LEDs) may be mounted to the portion of the sensor actuated by the actuator (e.g., the PCB) and move with the sensor to aim at objects of interest (so that the actuator adjusts a beam direction of one or more illumination sources toward the occupant or driver). Optionally, rather than moving a portion of the sensor (e.g., just the lens or PCB), the actuator may instead move or adjust the combined assembly of the PCB and lens (i.e., the entire camera). Movement of the sensor may be limited by the glass of the mirror (e.g., to limit glare). The actuator and sensor may utilize aspects of the actuators and sensors described in U.S. Pat. No. 10,313,597 and/or U.S. application Ser. No. 17/647,642, filed Jan. 11, 2022, now U.S. Pat. No. 11,800,222, which are all hereby incorporated herein by reference in their entireties.

Optionally, the sensor may be mounted to a stalk or mounting structure of the rearview mirror (that is fixedly mounted at an interior portion of the vehicle) such that when the rearview mirror head (that is pivotally mounted at the mounting structure via at least one pivot joint) is adjusted, the position of the sensor is unaffected. The image sensor may include an oversized imager or an atypical resolution (e.g., an image sensor with a resolution of 2048×2048 pixels instead of a typical resolution of 2048×1280 pixels) to allow for additional freedom to adjust the scene (e.g., by adjusting the position of the image sensor or the lens over the image sensor). Optionally, the image sensor may have sufficient size to eliminate the need for the actuator, and instead a control digitally shifts the image sensor by selecting a subset of images that capture an area of interest.

Optionally, the system may include a gyroscope or other sensor to detect a current position of the rearview mirror. Based on the determined position of the rearview mirror, the system adjusts the position of the camera or other sensor and/or the illumination sources (e.g., LEDs). The system may determine which illumination sources to enable/disable based on the determined position of the rearview mirror (i.e., the position of the camera). The system may receive signals from the ECU (e.g., via CAN or via LIN) to determine whether the vehicle is a right-hand drive vehicle or a left-hand drive vehicle. Alternatively, the system may process image data captured by the sensor to determine whether the vehicle is right-hand drive or left-hand drive. Based on the determination, they system may adjust an aim of the camera, the field of view of the camera, illumination power, and/or illumination selection.

The camera and system may be part of or associated with a driver monitoring system (DMS) and/or occupant monitoring system (OMS), where the image data captured by the camera is processed to determine characteristics of the driver and/or occupant/passenger (such as to determine driver attentiveness or drowsiness or the like). The DMS/OMS may utilize aspects of driver monitoring systems and/or head and face direction and position tracking systems and/or eye tracking systems and/or gesture recognition systems. Such head and face direction and/or position tracking systems and/or eye tracking systems and/or gesture recognition systems may utilize aspects of the systems described in U.S. Pat. Nos. 10,065,574; 10,017,114; 9,405,120 and/or 7,914,187, and/or U.S. Publication Nos. US-2022-0111857; US-2021-0323473; US-2021-0291739; US-2020-0202151; US-2020-0320320; US-2020-0143560; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or U.S. patent application Ser. No. 17/650,255, filed Feb. 8, 2022 and published Aug. 11, 2022 as U.S. Publication No. US-2022-0254132, Ser. No. 17/649,723, filed Feb. 2, 2022, now U.S. Pat. No. 11,851,080, and/or International Application No. PCT/US2022/072238, filed May 11, 2022 and published Nov. 17, 2022 as International Publication No. WO 2022/241423, International Application No. PCT/US2022/070882, filed Mar. 1, 2022 and published Sep. 9, 2022 as International Publication No. WO 2022/187805, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel (or other suitable processor or processing chip and/or software and algorithms, such as the types available from, for example, Smart Eye of Gothenburg, Sweden, Seeing Machines of Fyshwick ACT, Australia, and Eyesight or Cipia Vision Ltd of Herzliya, Israel), and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular driver monitoring system, the vehicular driver monitoring system comprising:
   a camera disposed at an interior rearview mirror assembly of a vehicle equipped with the vehicular driver monitoring system, the camera viewing interior of the vehicle and capturing image data;
   wherein the interior rearview mirror assembly comprises a mirror head that is adjustable relative to a mounting portion via at least one pivot joint, and wherein the mounting portion is attached at an interior portion of the vehicle;
   wherein the camera is disposed at the mirror head and moves in tandem with the mirror head when the mirror head is adjusted relative to the mounting portion;
   an electronic control unit (ECU) comprising electronic circuitry and associated software;
   wherein the electronic circuitry of the ECU comprises an image processor for processing image data captured by the camera;
   wherein the camera comprises an imaging array sensor and a lens;
   wherein the imaging array sensor comprises at least one million photosensor elements arranged in rows and columns;
   wherein the vehicular driver monitoring system, responsive to processing at the ECU of image data captured by the camera, monitors a body portion of a driver of the vehicle; and
   wherein the vehicular driver monitoring system adjusts viewing of the body portion of the driver by the camera to accommodate a change in a scene viewed by the camera.

2. The vehicular driver monitoring system of claim 1, wherein the vehicular driver monitoring system adjusts the camera to adjust viewing of the body portion of the driver by the camera.

3. The vehicular driver monitoring system of claim 2, wherein the camera is adjusted by adjusting the lens relative to the imaging array sensor.

4. The vehicular driver monitoring system of claim 3, wherein the camera is adjusted to increase resolution of an area of interest of the driver of the vehicle.

5. The vehicular driver monitoring system of claim 4, wherein the area of interest comprises the eyes of the driver.

6. The vehicular driver monitoring system of claim 5, wherein the vehicular driver monitoring system, via processing at the ECU of image data captured by the camera, determines driver drowsiness.

7. The vehicular driver monitoring system of claim 4, wherein the area of interest comprises the hands of the driver.

8. The vehicular driver monitoring system of claim 4, wherein a beam direction of one or more illumination sources is adjusted to illuminate the area of interest.

9. The vehicular driver monitoring system of claim 1, wherein the vehicular driver monitoring system, via processing at the ECU of image data captured by the camera, determines driver attentiveness.

10. The vehicular driver monitoring system of claim 1, wherein the vehicular driver monitoring system determines that the scene viewed by the camera has changed at least in part via processing of image data captured by the camera.

11. The vehicular driver monitoring system of claim 10, wherein the vehicular driver monitoring system adjusts viewing of the body portion of the driver by the camera responsive to determining that the scene viewed by the camera has changed.

12. The vehicular driver monitoring system of claim 1, wherein the vehicular driver monitoring system determines that the scene viewed by the camera has changed based at least in part on at least one selected from the group consisting of (i) a vehicle door opening and (ii) a vehicle door closing.

13. The vehicular driver monitoring system of claim 1, wherein the vehicular driver monitoring system determines that the scene viewed by the camera has changed based at least in part on a vehicle seat adjustment.

14. The vehicular driver monitoring system of claim 1, wherein the vehicular driver monitoring system adjusts viewing of the body portion of the driver by the camera responsive to receiving an indication that is indicative of adjustment of the mirror head relative to the mounting portion.

15. The vehicular driver monitoring system of claim 1, wherein the ECU is disposed in the mirror head.

16. The vehicular driver monitoring system of claim 1, comprising at least one actuator that is operable to adjust the camera to adjust viewing of the body portion of the driver by the camera.

17. The vehicular driver monitoring system of claim 16, wherein the at least one actuator comprises a plurality of actuators.

18. The vehicular driver monitoring system of claim 17, wherein the plurality of actuators adjust viewing of the body portion of the driver by the camera by adjusting the imaging array sensor or the lens along three independent axes.

19. The vehicular driver monitoring system of claim 16, wherein the at least one actuator is operable to adjust a beam direction of one or more illumination sources toward the driver.

20. The vehicular driver monitoring system of claim 16, wherein, responsive to processing at the ECU of image data captured by the camera, a beam direction of one or more illumination sources is adjusted to illuminate the monitored body portion of the driver of the vehicle.

21. A vehicular driver monitoring system, the vehicular driver monitoring system comprising:
  a camera disposed at an interior rearview mirror assembly of a vehicle equipped with the vehicular driver monitoring system, the camera viewing interior of the vehicle and capturing image data;
  wherein the interior rearview mirror assembly comprises a mirror head that is adjustable relative to a mounting portion via at least one pivot joint, and wherein the mounting portion is attached at an interior portion of the vehicle;
  wherein the camera is disposed at the mirror head and moves in tandem with the mirror head when the mirror head is adjusted relative to the mounting portion;
  an electronic control unit (ECU) comprising electronic circuitry and associated software;
  wherein the electronic circuitry of the ECU comprises an image processor for processing image data captured by the camera;
  wherein the camera comprises an imaging array sensor and a lens;
  wherein the imaging array sensor comprises at least one million photosensor elements arranged in rows and columns;
  wherein the vehicular driver monitoring system, responsive to processing at the ECU of image data captured by the camera, monitors the eyes of a driver of the vehicle;
  wherein the vehicular driver monitoring system, via processing at the ECU of image data captured by the camera, determines driver drowsiness; and
  wherein the vehicular driver monitoring system adjusts viewing of the eyes of the driver by the camera to accommodate a change in a scene viewed by the camera.

22. The vehicular driver monitoring system of claim 21, wherein the vehicular driver monitoring system adjusts the camera to adjust viewing of the eyes of the driver by the camera.

23. The vehicular driver monitoring system of claim 22, wherein the camera is adjusted by adjusting the lens relative to the imaging array sensor.

24. The vehicular driver monitoring system of claim 22, wherein the camera is adjusted to increase resolution of the eyes of the driver of the vehicle.

25. The vehicular driver monitoring system of claim 21, wherein a beam direction of one or more illumination sources is adjusted to illuminate the eyes of the driver of the vehicle.

26. The vehicular driver monitoring system of claim 21, wherein the vehicular driver monitoring system, responsive to determining a change in the eyes of the driver relative to a field of view of the camera, adjusts viewing of the eyes of the driver by the camera.

27. The vehicular driver monitoring system of claim 21, wherein the vehicular driver monitoring system adjusts viewing of the eyes of the driver by the camera responsive to determining a change in position of the eyes of the driver relative to a field of view of the camera.

28. The vehicular driver monitoring system of claim 21, wherein the vehicular driver monitoring system determines that the scene viewed by the camera has changed based at least in part on at least one selected from the group consisting of (i) a vehicle door opening, (ii) a vehicle door closing and (iii) a vehicle seat adjustment.

29. The vehicular driver monitoring system of claim 21, wherein the vehicular driver monitoring system adjusts viewing of the eyes of the driver by the camera responsive to receiving an indication that is indicative of adjustment of the mirror head relative to the mounting portion.

30. The vehicular driver monitoring system of claim 21, wherein the ECU is disposed in the mirror head.

31. The vehicular driver monitoring system of claim 21, wherein the vehicular driver monitoring system determines that the scene viewed by the camera has changed at least in part via processing of image data captured by the camera.

32. A vehicular driver monitoring system, the vehicular driver monitoring system comprising:

a camera disposed at an interior rearview mirror assembly of a vehicle equipped with the vehicular driver monitoring system, the camera viewing interior of the vehicle and capturing image data;

wherein the interior rearview mirror assembly comprises a mirror head that is adjustable relative to a mounting portion via at least one pivot joint, and wherein the mounting portion is attached at an interior portion of the vehicle;

wherein the camera is disposed at the mirror head and moves in tandem with the mirror head when the mirror head is adjusted relative to the mounting portion;

an electronic control unit (ECU) comprising electronic circuitry and associated software;

wherein the electronic circuitry of the ECU comprises an image processor for processing image data captured by the camera;

wherein the camera comprises an imaging array sensor and a lens;

wherein the imaging array sensor comprises at least one million photosensor elements arranged in rows and columns;

wherein the vehicular driver monitoring system, responsive to processing at the ECU of image data captured by the camera, monitors a body portion of a driver of the vehicle; and wherein the vehicular driver monitoring system, responsive to determining a change in position of the body portion of the driver within a field of view of the camera, adjusts viewing of the body portion of the driver by the camera.

33. The vehicular driver monitoring system of claim 32, wherein the vehicular driver monitoring system adjusts the camera to adjust viewing of the body portion of the driver by the camera.

34. The vehicular driver monitoring system of claim 33, wherein the camera is adjusted by adjusting the lens relative to the imaging array sensor.

35. The vehicular driver monitoring system of claim 34, wherein the camera is adjusted to increase resolution of the body portion of the driver of the vehicle.

36. The vehicular driver monitoring system of claim 32, wherein the body portion of the driver comprises the hands of the driver.

37. The vehicular driver monitoring system of claim 32, wherein a beam direction of one or more illumination sources is adjusted to illuminate the body portion of the driver.

38. The vehicular driver monitoring system of claim 32, wherein the vehicular driver monitoring system, via processing at the ECU of image data captured by the camera, determines driver attentiveness.

39. The vehicular driver monitoring system of claim 32, wherein the vehicular driver monitoring system adjusts viewing of the body portion of the driver by the camera responsive to receiving an indication that is indicative of adjustment of the mirror head relative to the mounting portion.

40. The vehicular driver monitoring system of claim 32, wherein the ECU is disposed in the mirror head.

41. The vehicular driver monitoring system of claim 32, wherein the vehicular driver monitoring system determines change in position of the body portion of the driver within the field of view of the camera at least in part via processing of image data captured by the camera.

\* \* \* \* \*